Nov. 11, 1924.
C. S. SMITH
1,514,737
METHOD OF MAKING COLLOIDAL SOLUTIONS
Filed June 6, 1918
Fig: 1
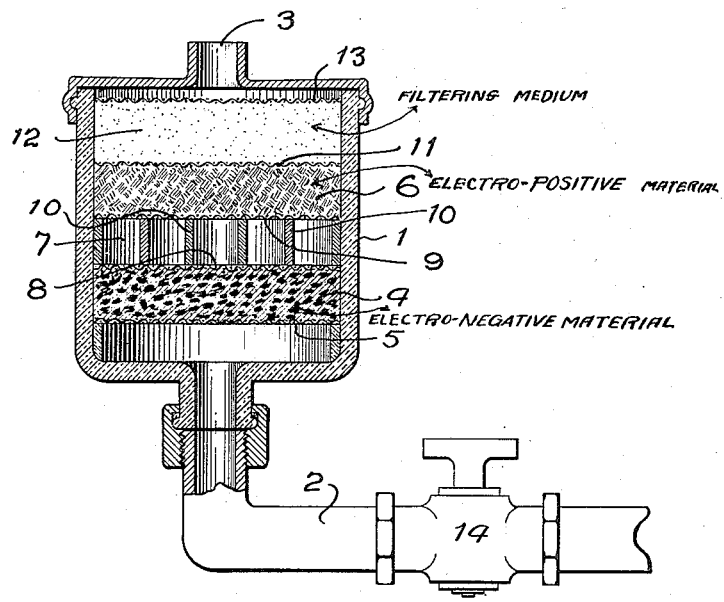
Fig: 2
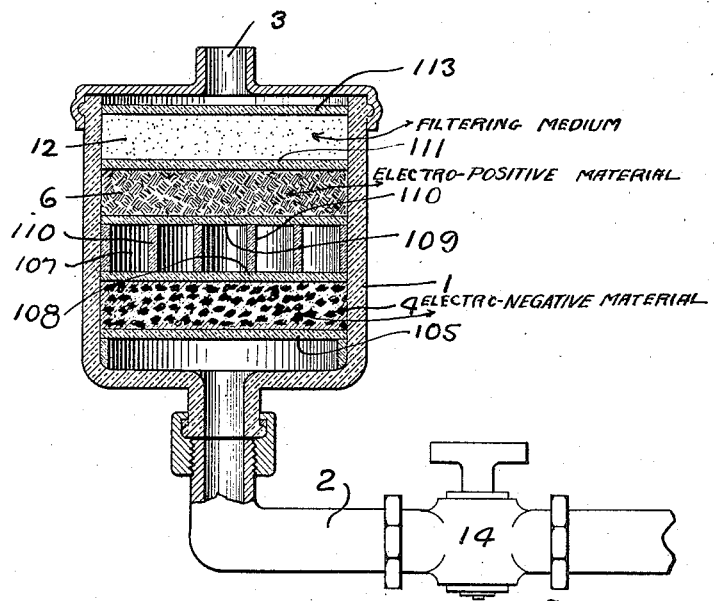
Inventor
Carolyn S. Smith
By her Attorneys
Emery, Booth, Janney & Varney Patented Nov. 11, 1924.

1,514,737

UNITED STATES PATENT OFFICE.

CAROLYN S. SMITH, OF BROOKLYN, NEW YORK.

METHOD OF MAKING COLLOIDAL SOLUTIONS.

Application filed June 6, 1918. Serial No. 238,486.

*To all whom it may concern:*

Be it known that I, CAROLYN S. SMITH, a citizen of the United States, a resident of the borough of Brooklyn, county of Kings, city and State of New York, have invented an Improvement in Methods of Making Colloidal Solutions, of which the following is a specification.

My invention relates to colloidal solutions, and method and apparatus for making the same. It is an object of the present invention to so treat liquids, such as water, for example, that the same are rendered useful for medicinal and analogous purposes, by reason of the formation in said liquids of colloidal substances suspended therein. Another object of the present invention is to devise a simple and efficient method and apparatus for producing the aforesaid products.

By way of example, I shall describe a preferred embodiment of the process of my invention, and of one of the products of said invention in the accompanying specification, two illustrative embodiments of the apparatus of my invention being illustrated in the accompanying drawings wherein:

Fig. 1 is a longitudinal sectional view, somewhat diagrammatic, of one such embodiment;

Fig. 2 is a similar view of the other embodiment.

In one of its forms, herein described by way of example merely, the process of my invention may comprise the treatment of a liquid, such as water, so that the same is provided with colloidal material, in finely divided form, suspended therein. For this purpose I prefer to bring the liquid into contact with successive layers of electro-positive and electro-negative materials. Preferably one or both of such materials, or all of such materials, where more than two are employed, are in sub-divided form. For example, where carbon is used as the electro-negative material, the same may be in granulated or other sub-divided form, as in the form of bone-black. The electro-positive material, which is preferably of a corrodible, metallic substance, is preferably also in sub-divided, as in granular, form.

Preferably I so subject the water in the course of the process that the same first comes into contact with the electro-negative material which, in the case of sub-divided carbon, for example, preliminarily filters the same to remove foreign substances which may be suspended therein.

The liquid with or without this preliminary filtering action, then comes into contact with the electro-positive material. Said material being of a corrodible, metallic character, electrolytic action is set up between the electro-positive and electro-negative materials, such electrolytic action resulting in the formation of colloidal material, generally in the form of metallic hydroxide. Where aluminum, for example, is employed, the corresponding aluminum hydroxide will be produced and will be held in suspension in the liquid. Other metals, such as magnesium, iron, or copper, may be employed.

It will be noted that in the illustrative embodiment of my process herein described, I do not employ an external source of current for the production of the colloidal substance which is to be suspended in the liquid. In this way I effect an economy of current employed, while at the same time I produce collodial substance in a more finely sub-divided form than is generally feasible where an external source of current is employed. In certain cases I may, if I so desire, use an external source of current, preferably of small strength, to assist in producing the collodial substance. This current superimposes its effect upon the purely galvanic effect produced by the electro-positive and electro-negative layers to increase the amount of colloidal substance produced.

In order to more effectively remove coarser particles of the colloidal substance which would tend to separate out from the liquid on permitting the latter to stand after it has been subjected to the process, I prefer to subject said liquid, after it has undergone the electrolytic action referred to, to a filtering process which results in the removal of the coarser particles of colloidal substance, the liquid finally containing only the finer colloidal particles which remain substantially permanently suspended therein.

Where, as is preferred, the successive layers of electro-positive and electro-negative materials are in sub-divided form, the water comes into contact with a very large superficial area of such materials with the result that while the electrolytic action is mild, the large area of contact results in the formation of a substantial amount of colloidal substances.

Instead of the single metals already described, I may employ several metals, mixed together in sub-divided form, or alloys of such metals, such as alloys or mixtures of iron and aluminum, preferably in sub-divided form. This results in the formation of what might be termed "colloidal complexes", consisting of mixtures of the two or more kinds of colloidal substances, such as the hydroxides of iron and aluminum, according to the particular substances employed.

Conductivity is provided by means of the salts normally and usually present in various liquids, such as ordinary drinking water. Where desired, additional salts may be added to the water, or distilled water may be employed and a certain predetermined amount of the desired salts, such as sodium chloride, ferrous or ferric chloride, or other salts, may be added to the distilled water to give the same the desired conductivity and to provide the same with the desired metallic constituents.

The resulting product comprises a liquid, such as water, having suspended therein colloidal substance in the form, for example, of metallic hydroxide or hydroxides, the coarser particles of such hydroxides being preferably removed so that the final solution contains substantially only the finer particles of colloidal substance which remain substantially permanently suspended in the liquid.

This product may be put up in ampules or capsules, or in any other desired form. It may here be stated that where the liquid, which may be used for food or medicinal purposes and finds particularly useful application as a medicinal beverage, is consumed shortly after its production, it is found that the colloidal particles are more readily assimilated by the human system.

Where it is preferred to use substantially pure water, which contains very little mineral salts, and is thus only very slightly conductive, and not to introduce any salts into said water to give the same the desired conductivity, it will of course become desirable to use an external source of current passing between the electro-negative and electro-positive materials. In this case the current should be chosen of such density that the colloidal particles, such as colloidal metals or metallic hydroxides, produced, will be sufficiently small to remain substantially permanently in suspension. Preferably the coarser particles are removed from such a solution by a filtering treatment. It is of course obvious however that the process of the present invention may be applied with equal or even greater facility to the class of waters which may be termed "saline" or "mineral" waters which contain a relatively high percentage of dissolved salts and the conductivity of which therefore is exceedingly greater with an increased tendency toward electro-chemical action in the presence of electro-negative and electro-positive bodies. Similarly the product of the present invention may be made in an equally good or even superior form by using such "saline" or "mineral" waters.

Referring to the illustrative embodiments of my apparatus herein shown and described, the apparatus shown in Fig. 1 of the drawing may comprise a receptacle 1, having an inlet for liquid 2, preferably at the bottom of such receptacle, and an outlet for liquid 3, preferably at the top of such receptacle. Within the receptacle 1 is a layer 4 of an electro-negative material, such as granular or subdivided carbon. Preferably the material 4 comprises a layer of bone-black which is maintained in position by means of a supporting member 5, consisting either of a fine mesh screen or a finely perforated plate. In the embodiment under consideration, the supporting member 5 may comprise a copper or brass finely perforated or fine mesh grid which is preferably given a coating of tin so as to render the same substantially non-corrodible.

Above layer 4 is a layer 6 of electro-positive material, consisting preferably of a metallic substance such as aluminum, magnesium, or alloys of aluminum or magnesium, such as aluminum or magnesium amalgams. Preferably this substance comprises a metal in sub-divided, as granular, form, which is corrodible and capable of forming particles in colloidal form, such as of metal or metallic hydroxides. I prefer to provide between layers 4 and 6 a separating and supporting member 7 which may consist of a plurality of grids 8 and 9 and annular spacing members 10 therebetween. Grids 8 and 9 may be constructed substantially similarly to supporting member 5. Moreover, grids 8 and 9 and annular spacing members 10 may also be made of copper or brass coated with tin.

Where it is desired to remove the coarser particles of colloidal substance, such as metallic hydroxide, produced in the liquid, I prefer to superimpose on layer 6 a grid 11 similar, for example, to member 5, on which is placed a layer 12 of fine sand or other suitable filtering material, a further grid 13 being placed on top of the layer 12 to confine the sand within the receptacle 1.

The operation of the device described will be substantially clear from the foregoing description of the same and from the description of the process given earlier in the specification. The inlet valve 14 is opened to admit liquid, such as water, which passes through the electro-negative layer 4 where it is given a preliminary filtering treatment. It then passes through the succeeding layer 6 of electro-positive material, said material being preferably in sub-divided form and by content with the liquid colloidal substance is produced consisting generally of metal or of metallic hydroxide. Further flow of the fluid brings the same into contact with layer 12 where the coarser particles of colloidal substance are removed, the final product passing out through outlet 3 and comprising a liquid containing finely divided colloidal particles substantially permanently suspended therein.

In the form of apparatus illustrated in Fig. 2, the grid members 105, 107, 108, 109, 110, 111, 113 corresponding to members 5, 7, 8, 9, 10, 11 and 13, instead of being made of metal, are made of a non-conducting material, such as coarse-grained unglazed porcelain, which permits the ready passage of the liquid therethrough and further assists in the preliminary filtering action and in the removal of the coarser colloidal particles which have a tendency to separate out the liquid on standing.

It is of course to be understood that many modifications of my invention may be made which come within the scope of the following claims, since the embodiments herein described are merely for purposes of illustration.

It is also to be understood that the term corrodible is merely a relative one, and includes all elements which form the electro-negative or "soluble" member of the electrolytic couple including also such elements as copper, mercury, silver, gold, and palladium which are not ordinarily considered corrodible in the popular sense of this term. It is also to be understood that the term "colloid," except where inconsistent with such a meaning, is intended to cover also metals, metal oxides, and other colloidal substances, as well as the hydroxides more particularly described herein.

While the receptacle containing the various operative parts of the apparatus may be of a conducting material, such as sheet iron or other metal, I prefer to make the same of a non-conducting material, such as glass or porcelain, as illustrated. While the positive and negative layers, preferably consisting of very finely divided material, may be, and preferably are, spaced from each other, as shown, I may, if desired, arrange said layers so that the same will be in contact with each other.

What I claim is:

1. The method which comprises bringing a liquid into contact with layers of non-corrodible negative material and corrodible metallic positive material to electrolytically produce colloidal substance, and removing said liquid with a part at least of said colloidal substance remaining in suspension therein.

2. The method which comprises bringing a liquid into contact with layers of non-corrodible negative material and corrodible metallic positive material to electrolytically produce colloidal substance containing metallic hydroxide, and removing said liquid with a part at least of said colloidal hydroxide remaining in suspension therein.

3. The method which comprises bringing a liquid into contact with layers of non-corrodible negative material and corrodible metallic positive material to electrolytically produce colloidal substance containing metallic hydroxide, said corrodible positive material being in sub-divided form, and removing said liquid with a part at least of said colloidal hydroxide remaining in suspension therein.

4. The method which comprises bringing a liquid into contact with layers of non-corrodible negative material and corrodible metallic positive material to electrolytically produce colloidal substance containing metallic hydroxide, said positive and negative materials being in sub-divided form, and removing said liquid with a part at least of said colloidal hydroxide remaining in suspension therein.

5. The method which comprises passing a liquid in a continuous stream through layers of non-corrodible negative material and corrodible metallic positive material to electrolytically produce colloidal substances containing metallic hydroxide, said positive and negative materials being in sub-divided form, and drawing off said liquid with a part at least of said colloidal hydroxide remaining in suspension therein.

6. The method which comprises bringing a liquid into contact with layers of non-corrodible negative material and corrodible metallic positive material to electrolytically produce colloidal substances containing metallic hydroxide, removing the coarser particles of metallic hydroxide, and removing said liquid with a part at least of said colloidal hydroxide remaining in suspension therein.

7. The method which comprises bringing a liquid into contact with layers of non-corrodible negative material and corrodible metallic positive material to electrolytically produce colloidal substances containing metallic hydroxide, said positive and negative materials being in sub-divided form, removing the coarser particles of metallic hydroxide, and removing said liquid with a part at least of said colloidal hydroxide remaining in suspension therein.

8. The method which comprises passing a liquid in a continuous stream through a layer of non-corrodible negative material to remove a substantial amount of the foreign solid matter suspended therein, then passing said liquid through a layer of corrodible metallic positive material to electrolytically produce colloidal substance containing metallic hydroxide, removing the coarser particles of metallic hydroxide, and removing said liquid with a part at least of said colloidal hydroxide remaining in suspension therein.

In testimony whereof, I have signed my name to this specification this 4th day of June, 1918.

CAROLYN S. SMITH.